United States Patent
Kibe et al.

(10) Patent No.: US 9,598,554 B2
(45) Date of Patent: Mar. 21, 2017

(54) HALOGEN-FREE FLAME-RETARDANT RESIN COMPOSITION, WIRE AND CABLE

(75) Inventors: Tamotsu Kibe, Hitachi (JP); Ryutaro Kikuchi, Mito (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 13/475,058

(22) Filed: May 18, 2012

(65) Prior Publication Data

US 2012/0292078 A1 Nov. 22, 2012

(30) Foreign Application Priority Data

May 19, 2011 (JP) ................. 2011-112446

(51) Int. Cl.
| | |
|---|---|
| C08L 31/04 | (2006.01) |
| C08K 13/02 | (2006.01) |
| H01B 7/295 | (2006.01) |
| C08K 3/22 | (2006.01) |
| C08K 5/13 | (2006.01) |
| C08K 5/25 | (2006.01) |
| C08L 23/08 | (2006.01) |
| C08K 5/00 | (2006.01) |
| C08K 5/3492 | (2006.01) |

(52) U.S. Cl.
CPC .............. *C08K 3/22* (2013.01); *H01B 7/295* (2013.01); *C08K 5/0041* (2013.01); *C08K 5/13* (2013.01); *C08K 5/25* (2013.01); *C08K 5/34924* (2013.01); *C08L 23/0853* (2013.01); *C08L 2201/02* (2013.01)

(58) Field of Classification Search
CPC ....... C08L 23/0853; C08L 23/06; C08K 5/13; C08K 3/22; C08K 2003/2241; C08K 5/23; C08K 5/29; C08K 5/3432; C08K 5/24; C08K 5/25; C08K 5/20; C08K 5/3492; H01B 7/02; H01B 7/17; H01B 7/295
USPC .......................... 524/94, 101, 193; 525/330.3
See application file for complete search history.

(56) References Cited

U.S. PATENT DOCUMENTS

| | | | |
|---|---|---|---|
| 2009/0133926 A1* | 5/2009 | Kambe ........................ 174/72 A |
| 2011/0162867 A1* | 7/2011 | Park ..................... C08K 5/3435 |
| | | | 174/110 SR |

FOREIGN PATENT DOCUMENTS

| | | | |
|---|---|---|---|
| JP | 63-056544 A | | 3/1988 |
| JP | 06086556 B | * | 11/1994 |
| JP | 2001-234001 | | 8/2001 |

(Continued)

OTHER PUBLICATIONS

Heitzman, S., "Colorants," Encyclopedia of Polymer Science and Technology, vol. 2 (2002).*

(Continued)

*Primary Examiner* — Susannah Chung
*Assistant Examiner* — Josephine Chang
(74) *Attorney, Agent, or Firm* — Roberts Mlotkowski Safran Cole & Calderon PC

(57) ABSTRACT

A halogen-free flame-retardant resin composition includes a polyolefin-based resin, a phenolic antioxidant, a metal hydroxide, a pigment comprising one of titanium dioxide, monoazo yellow, benzimidazolone yellow, isoindolinone yellow, quinacridone red and perylene red, and an additive including an amide bond. The additive having the amide bond is added in an amount of 0.01 to 2 parts by weight relative to 100 parts by weight of the polyolefin-based resin.

15 Claims, 1 Drawing Sheet

(56) References Cited

FOREIGN PATENT DOCUMENTS

| | | | |
|---|---|---|---|
| JP | 2004346100 A | * | 12/2004 |
| JP | 2007231240 A | * | 9/2007 |
| JP | 2009-199783 A | | 2/2008 |
| JP | 2008280444 A | * | 11/2008 |
| JP | 2009084524 A | * | 4/2009 |
| JP | 2009-199783 A | * | 9/2009 |
| JP | 2009199783 A | * | 9/2009 |

OTHER PUBLICATIONS

JP 2004-346100 A (2004), machine translation, JPO Advanced Industrial Property Network (AIPN).*
JP 2007-231240 A (2007), machine translation, JPO Advanced Industrial Property Network (AIPN).*
JP 2009-199783 A (2009), machine translation, JPO Advanced Industrial Property Network (AIPN).*
JP 06086556 B (1994), machine translation, JPO Advanced Industrial Property Network (AIPN).*
JP 2008-280444 A (2008), machine translation, JPO Advanced Industrial Property Network (AIPN).*
JP 2009-084524 A (2009), machine translation, JPO Advanced Industrial Property Network (AIPN).*
Klemchuk, P.P., "Antioxidants, Section 4.1 Hindered Phenols," Ullman's Encyclopedia of Industrial Chemistry, vol. 4, John Wiley & Sons (2000).*
Japanese Office Action dated Dec. 3, 2013 and English translation.

* cited by examiner

- 10 CONDUCTOR
- 1 WIRE
- 11 INSULATION

- 24 BINDER TAPE
- 2 CABLE
- 20 CONDUCTOR
- 21 INSULATION } 22 WIRE
- 25 SHEATH
- 23 INTERMEDIATE PAPER though the halogen-free flame-retardant resin composition is needed to be processed in a molding process at a relatively high temperature as compared to polyvinyl chloride (PVC), the antioxidant is likely to discolor even when the phenolic antioxidant is added thereto. In particular, it is likely to discolor when a large amount of magnesium hydroxide is added as a flame retardant to the halogen-free flame-retardant resin composition.

HALOGEN-FREE FLAME-RETARDANT RESIN COMPOSITION, WIRE AND CABLE

The present application is based on Japanese patent application No. 2011-112446 filed on May 19, 2011, the entire contents of which are incorporated herein by reference.

BACKGROUND OF THE INVENTION

1. Field of the Invention

The invention relates to a halogen-free flame-retardant resin composition, a wire and a cable, and, in particular, to a halogen-free flame-retardant resin composition that a discoloration caused by an antioxidant is suppressed. The invention also relates to a wire and a cable using the resin composition as an insulation or a sheath.

2. Description of the Related Art

Conventionally, compositions in which a metal hydroxide such as magnesium hydroxide or aluminum hydroxide, etc., is added to a polyolefin-based resin are used as a halogen-free flame-retardant resin composition which does not contain a halide. An antioxidant is added to such compositions for the purpose of suppressing deterioration during a molding process and when used.

As the antioxidant, a phenolic antioxidant or an amine antioxidant which suppresses cleavage of polymer molecular chains caused by radical formation is generally used (see, e.g., JP-A-2009-199783 and JP-A-63-56544). The amine antioxidant itself has a hue of yellow or brown, etc., and is also likely to discolor when used, hence, the phenolic antioxidant which is relatively less likely to discolor is often used for compositions which is desired to be white or light color.

SUMMARY OF THE INVENTION

However, since the halogen-free flame-retardant resin composition is needed to be processed in a molding process at a relatively high temperature as compared to polyvinyl chloride (PVC), the antioxidant is likely to discolor even when the phenolic antioxidant is added thereto. In particular, it is likely to discolor when a large amount of magnesium hydroxide is added as a flame retardant to the halogen-free flame-retardant resin composition.

The occurrence of discoloration does not cause any problems in a composition having a dark hue such as black, etc., but may cause a problem in a composition having a light hue such as white or yellow, etc., since the effect of discoloration is remarkable. When a halogen-free flame-retardant resin composition is used as, e.g., a material of a coating film of a wire in device used for identifying cables by a color of insulation layer, not obtaining a desired color makes cable identification difficult.

Accordingly, it is an object of the invention to provide a halogen-free flame-retardant resin composition that the discoloration caused by an antioxidant is suppressed, a wire and a cable.

(1) According to one embodiment of the invention, a halogen-free flame-retardant resin composition comprises:
a polyolefin-based resin;
a phenolic antioxidant;
a metal hydroxide;
a pigment comprising one of titanium dioxide, monoazo yellow, benzimidazolone yellow, isoindolinone yellow, quinacridone red and perylene red; and
an additive comprising an amide bond, wherein the additive having the amide bond is contained in an amount of 0.01 to 2 parts by weight relative to 100 parts by weight of the polyolefin-based resin.

In the above embodiment (1) of the invention, the following modifications and changes can be made.

(i) The phenolic antioxidant is added in an amount of 1.0 to 3.0 parts by weight relative to 100 parts by weight of the polyolefin-based resin.

(ii) The metal hydroxide is added in an amount of 150 to 300 parts by weight relative to 100 parts by weight of the polyolefin-based resin.

(iii) The resin composition further comprises a 1,3,5-triazine derivative added in an amount of 5 to 40 parts by weight relative to 100 parts by weight of the polyolefin-based resin.

(2) According to another embodiment of the invention, a wire comprises:
a conductor; and
an insulation layer formed on the conductor and comprising the halogen-free flame-retardant resin composition according to the embodiment (1).

(3) According to another embodiment of the invention, a cable comprises:
a wire comprising a conductor and an insulation formed on the conductor; and
a sheath formed on the wire and comprising the halogen-free flame-retardant resin composition according to the embodiment (1).

Effects of the Invention

According to one embodiment of the invention, a halogen-free flame-retardant resin composition can be provided that discoloration caused by an antioxidant is suppressed, as well as a wire and a cable using the resin composition.

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

Summary of Embodiments

Figure 1:
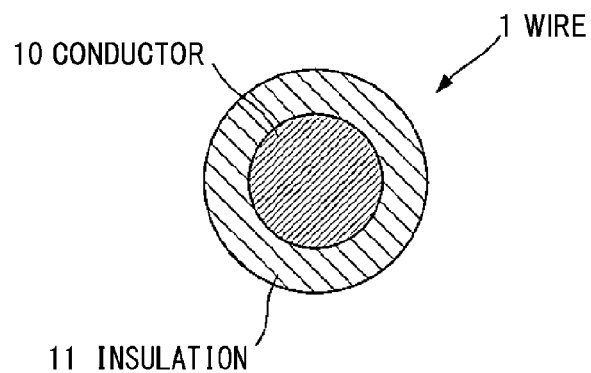
FIG. 1 is a cross sectional view showing a wire in a second embodiment of the present invention.

According to embodiments of the invention, after a metal hydroxide as a flame retardant, a phenolic antioxidant as an antioxidant and a pigment having a light hue are added to a polyolefin-based resin, an appropriate amount of an additive having an amide bond is further added thereto, and it is thereby possible to obtain a halogen-free flame-retardant resin composition having a light hue such as white or yellow, etc., of which discoloration is suppressed.

That is, in the embodiments of the invention, it is possible to suppress discoloration of the halogen-free flame-retardant resin composition even when an antioxidant causing discoloration is added in the same amount as the conventional art to a polyolefin-based resin.

In addition, by using the halogen-free flame-retardant resin composition for forming an insulation or a sheath coated on a conductor, it is possible to obtain wires and cables having a light hue in which discoloration is suppressed.

First Embodiment

A halogen-free flame-retardant resin composition in the first embodiment is formed by adding a phenolic antioxidant, a metal hydroxide as a flame retardant, a pigment and an additive having an amide bond to a polyolefin-based resin. A 1,3,5-triazine derivative as a flame retardant may be further added to the polyolefin-based resin.

Polyolefin-Based Resin

As the polyolefin-based resin, it is possible to use low-density polyethylene (LDPE), linear low-density polyethylene (LLDPE), linear very low-density polyethylene (VLDPE), high-density polyethylene (HDPE), ethylene-ethyl acrylate copolymer (EEA), ethylene-vinyl acetate copolymer (EVA), ethylene-styrene copolymer, ethylene-glycidyl methacrylate copolymer, ethylene-butene-1 copolymer, ethylene-butene-hexene terpolymer, ethylene-propylene-diene terpolymer (EPDM), ethylene-octene copolymer (EOR), ethylene copolymerized polypropylene, ethylene-propylene copolymer (EPR), poly(4-methyl-pentene-1), maleic acid grafted low density polyethylene, hydrogenated styrene-butadiene copolymer (H-SBR), maleic acid grafted linear low density polyethylene, a copolymer of ethylene and α-olefin having a carbon number of 4 to 20, ethylene-styrene copolymer, maleic acid grafted ethylene methyl acrylate copolymer, maleic acid grafted ethylene vinyl acetate copolymer, ethylene-maleic anhydride copolymer, ethylene-ethyl acrylate-maleic anhydride terpolymer and ethylene-propylene-butene-1 terpolymer consisting mainly of butene-1, etc., and it is especially preferable to use EVA. These polyolefin-based resins can be used alone or in combination of two or more thereof.

Metal Hydroxide

As the metal hydroxide, it is possible to use magnesium hydroxide, aluminum hydroxide and calcium hydroxide, etc. These metal hydroxides can be used alone or in combination of two or more thereof. In addition, these metal hydroxides may be surface-treated with a silane coupling agent, a titanate-based coupling agent, fatty acid such as stearic acid or calcium stearate, or fatty acid metal salt, etc.

In the present embodiment, it is possible to impart excellent flame retardancy to the halogen-free flame-retardant resin composition by adding 150 to 300 parts by weight of the metal hydroxide to 100 parts by weight of the polyolefin-based resin. When the added amount is less than 150 parts by weight, it is not possible to impart sufficient flame retardancy to the halogen-free flame-retardant resin composition. When added amount is more than 300 parts by weight, the elongation characteristic of the halogen-free flame-retardant resin composition is significantly degraded.

Phenolic Antioxidant

The phenolic antioxidant, which has a molecule containing a phenolic group in a molecular framework, is not specifically limited and it is possible to use, e.g., dibutyl-hydroxytoluene (BHT), pentaerythritol tetrakis[3-(3,5-di-t-butyl-4-hydroxyphenyl)propionate], 1,3,5-tris(3,5-di-t-butyl-4-hydroxybenzyl)-s-triazine-2,4,6(1H,3H,5H)trione and thiodiethylene bis[3-(3,5-di-tert-butyl-4-hydroxyphenyl) propionate], etc. These phenolic antioxidants can be used alone or in combination of two or more thereof.

In the present embodiment, it is possible to effectively suppress oxidation of the halogen-free flame-retardant resin composition by adding 1.0 to 3.0 parts by weight of phenolic antioxidant to 100 parts by weight of the polyolefin-based resin. When the added amount is less than 1.0 part by weight, it is not possible to sufficiently suppress oxidation of the halogen-free flame-retardant resin composition. When added amount is more than 3.0 parts by weight, discoloration of the halogen-free flame-retardant resin composition is more likely to occur.

Additive Having Amide Bond

The additive having an amide bond is not specifically limited and it is possible to use, e.g., 1,3-benzenedicarboxylic acid bis[2-(1-oxo-2-phenoxypropyl)hydrazide], 2-3-bis[[3-[3,5-di-tert-butyl-4-hydroxyphenyl]propionyl]]propionohydrazide, 3-(N-salicyloyl)amino-1,2,4-triazole and dodecanedioic acid bis[N2-(2-hydroxybenzoyl)hydrazide], etc. It is especially preferable to use dodecanedioic acid bis[N2-(2-hydroxybenzoyl)hydrazide]. These additives having an amide bond can be used alone or in combination of two or more thereof.

It is possible to obtain an effect of suppressing discoloration of the phenolic antioxidant by adding not less than 0.01 parts by weight of the additive having an amide bond to 100 parts by weight of the polyolefin-based resin. In addition, the added amount is preferably 0.01 to 2 parts by weight since an additive having an amide bond is generally expensive and a large amount of addition thereof may affect other physical properties such as degree of crosslinking.

Pigment

As a pigment, it is possible to use titanium dioxide, monoazo yellow, benzimidazolone yellow, isoindolinone yellow, quinacridone red and perylene red, etc. These pigments are used for forming compositions having a light hue such as white or yellow, etc. These pigments can be used alone or in combination of two or more thereof. In addition, other pigments may be combined therewith. A titanium dioxide is also called titanium(IV) oxide or simply called oxidized titanium or titania, and is classified into rutile type and anatase type depending on the structure thereof. Both types can be used, but use of a rutile-type titanium dioxide is more preferable.

The added amount of the pigment is not specifically limited as long as within a range to be used as a pigment, however, 0.1 to 20 parts by weight per 100 parts by weight of the polyolefin-based resin is preferable. A coloring effect is reduced when less than 0.1 parts by weight and an elongation characteristic, etc., is degraded when more than 20 parts by weight. The pigment may be added directly or may be added in a form of a color masterbatch, etc., mixed with a dispersant, etc., to improve dispersibility of the pigment.

1,3,5-Triazine Derivative

The 1,3,5-triazine derivative is decomposed, is sublimed and generates non-combustible gas when burnt at not less than 300° C., and is thus considered to contribute to flame retardancy of the halogen-free flame-retardant resin composition. As a 1,3,5-triazine derivative, it is possible to use melamine, cyanuric acid, isocyanuric acid, melamine cyanurate and melamine sulfate, etc., and it is especially preferable to use melamine cyanurate. These 1,3,5-triazine derivatives may be surface-treated with a non-ionic surface-active agent or various coupling agents.

It is preferable that 5 to 40 parts by weight of 1,3,5-triazine derivative be added to 100 parts by weight of the polyolefin-based resin. Sufficient flame retardancy is not imparted to the halogen-free flame-retardant resin composition when the added amount is less than 5 parts by weight, and mechanical characteristics of the halogen-free flame-retardant resin composition are degraded when more than 40 parts by weight.

Other Additives

Besides the above-mentioned additives, it is possible to add additives such as antioxidants other than phenol series, metal deactivators, flame retardants, flame-retardant aids, cross-linking agents, crosslinking aids, lubricants, inorganic fillers, compatibilizing agents, stabilizers, carbon black and colorants, etc., where appropriate. In addition, polymer may be cross-linked by using an organic peroxide or by exposing to radiation such as electron beam.

The antioxidant other than phenol series is not specifically limited and it is possible to use, e.g., sulphur-based antioxidants, etc. Although the sulphur-based antioxidant is not specifically limited, it is preferable to use tetrakis[methylene-3-(dodecylthio)propionate]methane. The antioxidant other than phenol series can be used alone or a combination of two or more.

The flame retardant other than the metal hydroxide is not specifically limited and it is possible to use, e.g., boric-acid compounds such as zinc borate, calcium borate, barium borate and barium metaborate, etc., nitrogen-based flame retardants such as guanidine sulfamate, melamine sulfate and melamine cyanurate, etc., phosphorus-based flame retardants or intumescent flame retardants formed of a mixture of a component to be foamed at the time of combustion and a component to be solidified.

Although the crosslinking aid is not specifically limited, it is preferable to use, e.g., trimethylolpropane trimethacrylate (TMPT) or triallyl isocyanurate (TAIC).

Manufacturing of Halogen-Free Flame-Retardant Resin Composition

Firstly, a polyolefin-based resin to which a metal hydroxide, a phenolic antioxidant, a pigment, an additive having an amide bond and other compounds mentioned above are added is kneaded using a pressure kneader while heating, thereby obtaining a halogen-free flame-retardant resin composition.

Here, the maximum kneading temperature is, e.g., 160° C. to 240° C. A high-quality halogen-free flame-retardant resin composition is not obtained when the maximum temperature is lower than 160° C. When the maximum temperature is higher than 240° C., discoloration of the halogen-free flame-retardant resin composition is more likely to occur.

Second Embodiment

FIG. 1 schematically shows a cross section of a wire in a second embodiment of the invention.

A wire 1 in the second embodiment has a conductor 10 and an insulation 11 covering the conductor 10. Here, the insulation 11 is mainly formed of the halogen-free flame-retardant resin composition explained in the first embodiment.

Third Embodiment

Figure 2:
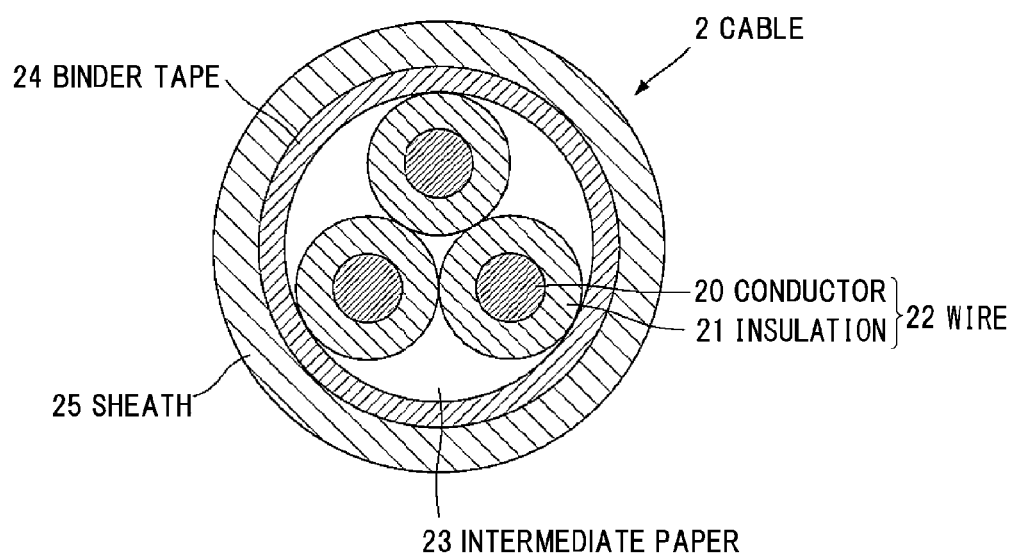
FIG. 2 is a cross sectional view showing a cable in a third embodiment of the invention.

FIG. 2 schematically shows a cross section of a cable in a third embodiment of the invention.

A cable 2 in the third embodiment has three wires 22 each composed of a conductor 20 coated with an insulation 21, an intermediate paper 23 twisted together with the three wires 22, a binder tape 24 wound around the three wires 22 as well as the intermediate paper 23, and a sheath 25 provided on the outermost layer of the cable 2 by extrusion coating. Here, the sheath 25 is mainly formed of the halogen-free flame-retardant resin composition explained in the first embodiment.

Effects of the Embodiments

In the first embodiment, after a metal hydroxide as a flame retardant, a phenolic antioxidant as an antioxidant and a pigment having a light hue are added to a polyolefin-based resin, an appropriate amount of an additive having an amide bond is further added thereto, and it is thereby possible to obtain a halogen-free flame-retardant resin composition having a light hue such as white or yellow, etc., of which discoloration is suppressed.

Meanwhile, in the second and third embodiments, it is possible to obtain a wire and a cable formed using a halogen-free flame-retardant resin composition having a light hue of which discoloration at the time of manufacture and when used is suppressed.

Alternatively, the halogen-free flame-retardant resin composition in the embodiments may be used for manufacturing agricultural films, stretch films, tubes, packing materials and plastics components for home electronics, vehicles and medical use, etc.

The mechanism that discoloration is suppressed by adding an additive having an amide bond is considered to be as follows.

In general, radical cleavage is likely to occur in a polymer molecule due to heat or a shearing force during a molding process of the resin composition. As a result, the main chains of the polymer are broken one after another by the generated radicals, which promotes deterioration of the polymer. The phenolic antioxidant has an effect of suppressing deterioration of the polymer since hydrogen radicals are supplied from the phenol portion of the radicals per se which are generated in the polymer.

However, the phenolic antioxidant which has supplied hydrogen radicals receives heat or a shearing force during a molding process and a phenol skeleton in the phenolic antioxidant is transformed into a quinone skeleton having a carbon-oxygen double bond. Since the molecule having a quinone skeleton has a hue of yellow or brown, etc., the resin composition is entirely discolored. Here, the phenol skeleton and the quinone skeleton are respectively represented by the following structural formulas I and II.

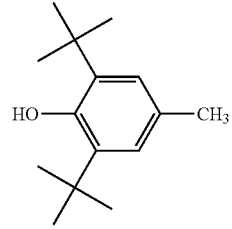

(Structural formula I)

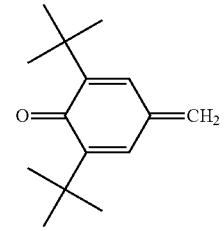

(Structural formula II)

Accordingly, the additive having an amide bond is added so that hydrogen radicals are supplied from the amide group to the phenolic antioxidant, and it is thus possible to suppress transformation into the quinone skeleton.

In the result of the study by the inventors, the effect of suppressing the discoloration was not observed by addition of a phenolic antioxidant and an amine antioxidant which are generally used as an additive for supplying hydrogen radicals.

It is considered that, in the additive having an amide bond, properties of donating hydrogen radicals from an amino group is improved since an electro-withdrawing carbonyl group is adjacent to an amino group.

Examples

Sheets formed of the halogen-free flame-retardant resin composition and wires formed by coating a conductor with an insulation formed of the halogen-free flame-retardant resin composition were made in Examples and Comparative Examples, and the characteristics thereof were evaluated.

Table 1 shows compounding ingredients and compounding ratios of the halogen-free flame-retardant resin compositions in Examples 1 to 14 and the evaluation results thereof. The compounding ingredients and the compounding ratio in Examples 1 to 14 are respectively within the ranges defined in the first embodiment.

As an additive having an amide bond, dodecanedioic acid bis[N2-(2-hydroxybenzoyl)hydrazide] and 1,3-benzenedicarboxylic acid bis[2-(1-oxo-2-phenoxypropyl)hydrazide] were used.

A magnesium hydroxide (Magseeds S4, manufactured by Konoshima Chemical Co., Ltd.) was used as a metal hydroxide.

Melamine cyanurate (MC-5S, manufactured by Sakai Chemical Industry Co., Ltd.) was used as a 1,3,5-triazine derivative.

Dibutylhydroxytoluene (BHT) (BHT SWANOX, manufactured by Seiko Chemical Co., Ltd.) and pentaerythritol tetrakis[3-(3,5-di-t-butyl-4-hydroxyphenyl)propionate] (Irganox 1010, manufactured by BASF Japan Ltd.) were used as a phenolic antioxidant.

A sulphur-based antioxidant (Seenox 412S, manufactured by Shipro Kasei Kaisha Ltd.) was used as an antioxidant other than phenol series.

TABLE 1

| | | | Examples: compounding amount (parts by weight) | | | | | | | | | | | | | |
|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 |
| Compounding ingredient | Polyolefin-based resin | EVA (Vinyl acetate content: 33 wt %) | 100 | 100 | 100 | 100 | 100 | 100 | 100 | | 50 | 80 | 100 | 100 | 100 | 100 |
| | | EVA (Vinyl acetate content: 28 wt %) | | | | | | | | 100 | 50 | | | | | |
| | | LDPE | | | | | | | | | | 20 | | | | |
| | Additive having an amide bond | Dodecanedioic acid bis[N2-(2-hydroxybenzoyl)hydrazide] | 0.01 | 2.0 | | 0.005 | 0.5 | 0.5 | 0.5 | 0.5 | 0.5 | 0.5 | 0.5 | 0.5 | 0.5 | 0.5 |
| | | 1,3-benzenedicarboxylic acid bis[2-(1-oxo-2-phenoxypropyl)hydrazide] | | | 0.01 | 0.005 | | | | | | | | | | |
| | Metal hydroxide | Magnesium hydroxide | 200 | 200 | 200 | 200 | 200 | 200 | 200 | 200 | 200 | 200 | 150 | 300 | 200 | 200 |
| | 1,3,5-triazine derivative | Melamine cyanurate | 10 | 10 | 10 | 10 | 10 | 10 | 10 | 10 | 10 | 10 | 10 | 10 | 5 | 40 |
| | Phenolic antioxidant | BHT | 1.0 | 1.0 | 1.0 | 1.0 | 3.0 | | 1.0 | 1.0 | 1.0 | 1.0 | 1.0 | 1.0 | 1.0 | 1.0 |
| | | Pentaerythritol tetrakis[3-(3,5-di-t-butyl-4-hydroxyphenyl)propionate] | | | | | | 1.0 | 1.0 | | | | | | | |
| | Other antioxidants | Sulphur-based antioxidant | 0.5 | 0.5 | 0.5 | 1.5 | 0.5 | 0.5 | 0.5 | 0.5 | 0.5 | 0.5 | 0.5 | 0.5 | 0.5 | 0.5 |
| | Pigment | Titanium dioxide | 0.1 | 20 | 5 | 5 | 0 | 5 | 5 | 5 | 5 | 5 | 5 | 5 | 5 | 5 |
| | | Monoazo yellow | | | | | 5 | 1 | | | | | | | | |
| Tests | Discoloration test | Evaluation | ○ | ○ | ○ | ○ | ○ | ○ | ○ | ○ | ○ | ○ | ○ | ○ | ○ | ○ |
| | Tensile Test | Tensile strength (MPa) | 12.9 | 11.9 | 13.0 | 13.0 | 12.3 | 12.9 | 12.2 | 13.4 | 12.3 | 13.5 | 13.4 | 12.8 | 12.7 | 13.0 |
| | | Evaluation | ○ | ○ | ◎ | ◎ | ○ | ○ | ○ | ◎ | ○ | ◎ | ◎ | ○ | ○ | ◎ |
| | | Elongation (%) | 190 | 190 | 200 | 200 | 220 | 190 | 200 | 170 | 190 | 170 | 260 | 160 | 200 | 230 |
| | | Evaluation | ○ | ○ | ○ | ○ | ○ | ○ | ○ | ○ | ○ | ○ | ○ | ○ | ○ | ○ |
| | Flame-retardant test | Evaluation | ○ | ○ | ○ | ○ | ○ | ○ | ○ | ○ | ○ | ○ | ◎ | ○ | ○ | ◎ |

In Examples 1 to 14 shown in Table 1, ethylene-vinyl acetate copolymer (EVA) and low-density polyethylene (LDPE) were used as a polyolefin-based resin. Here, EVA containing 33 wt % of vinyl acetate and EVA containing 28 wt % of vinyl acetate were used. Both EVAs contain 50 ppm of dibutylhydroxytoluene (BHT) and have a melt flow rate (MFR) of 1.0.

LDPE has a density of 924 kg/m$^3$ and a MFR of 0.4.

A titanium dioxide (R-680, manufactured by Ishihara Sangyo Kaisha, Ltd.) and monoazo yellow (A-3 Yellow, manufactured by Dainichiseika Color & Chemicals Mfg. Co., Ltd.) were used as a pigment.

The added amount of the additive having an amide bond was different in, e.g., Examples 1 and 2, within the preferred range defined in the first embodiment (0.01 to 2 parts by weight per 100 parts by weight of the polyolefin-based resin).

An additive having an amide bond used in Example 3 was different from that used in other Examples. In Example 4, two different additives having an amide bond were combined.

In Example 5, the added amount of BHT as a phenolic antioxidant was more than that in other Examples within the preferred range defined in the first embodiment (1.0 to 3.0 parts by weight per 100 parts by weight of the polyolefin-based resin). In Example 6, a phenolic antioxidant different from that in the other Examples was used. In Example 7, two kinds of phenolic antioxidant, i.e., BHT and the phenolic antioxidant in Example 7 are used within the preferred range defined in the first embodiment (1.0 to 3.0 parts by weight per 100 parts by weight of the polyolefin-based resin).

In Example 8, EVA of which vinyl acetate content is different from that in other Examples was used as a polyolefin-based resin.

In Example 9, EVAs containing different amounts of vinyl acetate were combined. In Example 10, a polyolefin-based resin different from that in other Examples was used.

In Example 11, the added amount of magnesium hydroxide as a metal hydroxide was less than that in other Examples within the preferred range defined in the first embodiment (150 to 300 parts by weight per 100 parts by weight of the polyolefin-based resin). In Example 12, more magnesium hydroxide than in other Examples was added.

In Example 13, the added amount of melamine cyanurate as a 1,3,5-triazine derivative was less than that in other Examples within the preferred range defined in the first embodiment (0.1 to 20 parts by weight per 100 parts by weight of the polyolefin-based resin). In Example 14, more 1,3,5-triazine derivative than in other Examples was added.

Table 2 shows compounding ingredients and compounding ratios of the halogen-free flame-retardant resin compositions in Comparative Examples 1 to 10 and the evaluation results thereof.

TABLE 2

| | | | Comparative Examples: compounding amount (parts by weight) | | | | | | | | | |
|---|---|---|---|---|---|---|---|---|---|---|---|---|
| | | | 1 | 2 | 3 | 4 | 5 | 6 | 7 | 8 | 9 | 10 |
| Compounding ingredient | Polyolefin-based resin | EVA (Vinyl acetate content: 33 wt %) | 100 | 100 | 100 | 100 | 100 | 100 | 100 | 100 | 100 | 100 |
| | Additive having an amide bond | Dodecanedioic acid bis[N2-(2-hydroxybenzoyl)hydrazide] | 0.005 | | 0.0025 | | | 3.0 | 0.005 | 0.005 | 0.005 | 0.005 |
| | | 1,3-benzenedicarboxylic acid bis[2-(1-oxo-2-phenoxypropyl)hydrazide] | | 0.005 | 0.0025 | | | | | | | |
| | Metal hydroxide | Magnesium hydroxide | 200 | 200 | 200 | 200 | 200 | 200 | 140 | 310 | 200 | 200 |
| | 1,3,5-triazine derivative | Melamine cyanurate | 10 | 10 | 10 | 10 | 10 | 10 | 10 | 10 | 0 | 50 |
| | Phenolic antioxidant | BHT | 1.0 | 1.0 | 1.0 | 1.0 | 1.0 | 1.0 | 1.0 | 1.0 | 1.0 | 1.0 |
| | Amine antioxidant | 4,4'-bis($\alpha,\alpha$-dimethylbenzyl)diphenylamine | | | | | 0.5 | | | | | |
| | | N,N'-di-2-naphthyl-p-phenylenediamine | | | | | | 0.5 | | | | |
| | Other antioxidants | Sulphur-based antioxidant | 0.5 | 0.5 | 0.5 | 0.5 | 0.5 | 0.5 | 0.5 | 0.5 | 0.5 | 0.5 |
| | Pigment | Titanium dioxide | 5 | 5 | 5 | 5 | 5 | 5 | 5 | 5 | 5 | 5 |
| Tests | Discoloration test | Evaluation | X | X | X | X | X | ○ | X | X | X | X |
| | Tensile Test | Tensile strength (MPa) | 12.4 | 12.4 | 12.9 | 12.1 | 11.9 | 9.9 | 13.4 | 13.0 | 12.6 | 12.9 |
| | | Evaluation | ○ | ○ | ○ | ○ | ○ | X | ◉ | ◉ | ○ | ○ |
| | | Elongation (%) | 200 | 190 | 210 | 220 | 230 | 270 | 270 | 130 | 180 | 140 |
| | | Evaluation | ○ | ○ | ○ | ○ | ○ | ○ | ○ | X | ○ | X |
| | Flame-retardant test | Evaluation | ○ | ○ | ○ | ○ | ○ | ○ | X | ○ | X | ○ |

In Comparative Examples 1 to 10 shown in Table 2, EVA was used as a polyolefin-based resin. The EVA contains 33 wt % of vinyl acetate and 50 ppm of BHT, and has the MFR of 1.0.

As an additive having an amide bond, dodecanedioic acid bis[N2-(2-hydroxybenzoyl)hydrazide] and 1,3-benzenedicarboxylic acid bis[2-(1-oxo-2-phenoxypropyl)hydrazide] were used.

A magnesium hydroxide (Magseeds S4, manufactured by Konoshima Chemical Co., Ltd.) was used as a metal hydroxide.

Melamine cyanurate (MC-5S, manufactured by Sakai Chemical Industry Co., Ltd.) was used as a 1,3,5-triazine derivative.

BHT (BHT SWANOX, manufactured by Seiko Chemical Co., Ltd.) was used as a phenolic antioxidant.

4,4'-bis($\alpha,\alpha$-dimethylbenzyl)diphenylamine (Nocrac CD, manufactured by Ouchi Shinko Chemical Industrial Co., Ltd.) and N,N'-di-2-naphthyl-p-phenylenediamine (Nocrac White, manufactured by Ouchi Shinko Chemical Industrial Co., Ltd.) were used as an amine antioxidant.

A sulphur-based antioxidant (Seenox 412S, manufactured by Shipro Kasei Kaisha Ltd.) was used as an antioxidant other than the phenol and amine antioxidants.

A titanium dioxide (R-680, manufactured by Ishihara Sangyo Kaisha, Ltd.) was used as a pigment.

The added amount of the additive having an amide bond is less than the range defined in the first embodiment (0.01 to 2 parts by weight per 100 parts by weight of the polyolefin-based resin) in, e.g., Comparative Examples 1 to 3. In Comparative Examples 4 and 5, an amine antioxidant was added instead of the additive having an amide bond. In Comparative Example 6, the added amount of the additive having an amide bond is more than the range defined in the first embodiment.

In Comparative Example 7, the added amount of the magnesium hydroxide as a flame retardant is less than the range defined in the first embodiment (150 to 300 parts by weight per 100 parts by weight of the polyolefin-based resin). In Comparative Example 8, the added amount of the magnesium hydroxide as a flame retardant is more than the range defined in the first embodiment.

In Comparative Example 9, the added amount of the melamine cyanurate as a flame retardant is less than the range defined in the first embodiment (5 to 40 parts by weight per 100 parts by weight of the polyolefin-based resin). In Comparative Example 10, the added amount of the melamine cyanurate as a flame retardant is more than the range defined in the first embodiment.

Firstly, compounds, etc., were mixed at the respective compounding ratios shown in Tables 1 and 2 and kneaded using a pressure kneader while heating, thereby obtaining kneaded products. Here, a low temperature-kneaded product kneaded under the temperature conditions of an initiation temperature of 40° C. and a termination temperature of 150° C., a medium temperature-kneaded product kneaded under the temperature conditions of an initiation temperature of 40° C. and a termination temperature of 190° C. and a high temperature-kneaded product kneaded under the temperature conditions of an initiation temperature of 40° C. and a termination temperature of 240° C. were formed.

Then, the low temperature-kneaded product and the high temperature-kneaded product were formed into a pellet shape, processed by an 8-inch open roll and then pressed under the pressure condition of a temperature of 180° C., thereby obtaining a halogen-free flame-retardant resin composition sheet with a defined thickness.

Meanwhile, the medium temperature-kneaded product was extruded on an outer periphery of a conductor at a preset temperature of 200° C. so as to have a film thickness of 0.81 mm, thereby forming a wire in which a conductor is coated with an insulation formed of the halogen-free flame-retardant resin composition. Subsequently, the wire was exposed to an electron beam at a dose rate of 30 kGy.

The sheets and the wires were evaluated by the following methods.

Discoloration Test

Occurrence of discoloration in the sheet formed of the low temperature-kneaded product and that formed of the high temperature-kneaded product was visually observed, and the sheets with discoloration were judged as unacceptable (indicated by "X (cross)"), and the sheets without discoloration were judged as acceptable (indicated by "O (circle)").

Tensile Test

A tensile test was conducted on the wires in accordance with JIS C 3005. As for the evaluation of tensile test, the wires with tensile strength of less than 10 MPa were judged as unacceptable (X), the wires with tensile strength of 10 to 13 MPa were judged as acceptable (O) and the wires with tensile strength of more than 13 MPa were judged as excellent (indicated by "⊚ (double circle)"). As for the evaluation of elongation, the wire with elongation of less than 150% were judged as unacceptable (X), the wires with elongation of 150 to 300% were judged as acceptable (O) and the wires with elongation of not less than 300% were judged as excellent (⊚).

Flame-Retardant Test

A vertical flame test (VW-1) was conducted on the wires. The VW-1 test is a flame-retardant test in accordance with UL subject 758. For evaluation of flame retardancy, the wires with burning time of less than 30 seconds were judged as excellent (⊚), the wires with burning time of less than 1 minute were judged as acceptable (O) and the wires with burning time of not less than 1 minute were judged as unacceptable (X).

Evaluation Results of Examples

The halogen-free flame-retardant resin compositions in Examples 1 to 14 had acceptable results in all the discoloration test of the sheet, the tensile test of the wire (the tensile strength test and the elongation test) and the flame-retardant test.

In addition, from the comparison of the results of Examples 11 to 14, it was found that flame retardancy is improved with increasing the added amount of magnesium hydroxide and melamine cyanurate as a flame retardant.

Evaluation Results of Comparative Examples

The results of the discoloration test of the halogen-free flame-retardant resin composition sheets in Comparative Examples 1 to 5 and 7 to 10 were judged as unacceptable. For example, in Comparative Examples 1 to 5, it is considered that the discoloration occurred since the added amount of the additive having an amide bond is less than the range defined in the first embodiment.

On the other hand, in Comparative Example 6, although the results of the discoloration of then sheet was judged as acceptable, the results of the tensile test were judged as unacceptable since the added amount of the additive having an amide bond is more than the range defined in the first embodiment. It is considered that this is because the additive having excessive amide bonds inhibits cross-linking when being exposed to an electron beam.

In addition, the results of the flame-retardant test of the halogen-free flame-retardant resin compositions in Comparative Examples 7 and 9 were judged as unacceptable. It is believed that this is because the added amount of magnesium hydroxide or melamine cyanurate as a flame retardant is less than the range defined in the first embodiment.

Furthermore, the results of the elongation test of the halogen-free flame-retardant resin compositions in Comparative Examples 8 and 10 were judged as unacceptable. It is believed that this is because the added amount of magnesium hydroxide or melamine cyanurate as a flame retardant is more than the range defined in the first embodiment.

Although the case of adding the phenolic antioxidant at the time of manufacturing the resin composition has been described in Examples of the invention, it is possible to obtain the same effect also in a case where the phenolic antioxidant is added not at the time of manufacturing the resin composition but at the time of polymerizing the polymer in order to prevent oxidation of the polymer.

Although the embodiments and examples of the invention have been described, the invention according to claims is not to be limited to the above-mentioned embodiments and examples. Further, please note that not all combinations of the features described in the embodiments and examples are not necessary to solve the problem of the invention.

What is claimed is:

1. A halogen-free flame-retardant resin composition, consisting of:
   a polyolefin-based resin consisting of an ethylene-vinyl acetate copolymer (EVA), or an ethylene-vinyl acetate copolymer (EVA) and a low-density polyethylene (LDPE);
   a phenolic antioxidant comprising one of dibutylhydroxytoluene (BHT) and thiodiethylene bis[3-(3,5-di-tert-butyl-4-hydroxyphenyl)propionate], present in an amount of from 1 to 3 parts by weight relative to 100 parts by weight of the polyolefin-based resin;
   a metal hydroxide present in an amount of from 150 to 300 parts by weight relative to 100 parts by weight of the polyolefin-based resin;
   a pigment comprising one of monoazo yellow, benzimidazolone yellow, isoindolinone yellow, quinacridone red, and perylene red;
   at least one an additive comprising an amide bond selected from the group consisting of 1,3-benzenedicarboxylic acid bis[2-(1-oxo-2-phenoxypropyl)hydrazide], 2-3-bis[[3-[3,5-di-tert-butyl-4-hydroxyphenyl] propionyl]] propionohydrazide, and dodecanedioic acid bis[N2-(2-hydroxybenzoyl)hydrazide], the at least one additive is present in an amount of from 0.01 to 2 parts by weight relative to 100 parts by weight of the polyolefin-based resin;
   a 1,3,5-triazine derivative present in an amount of from 5 to 40 parts by weight relative to 100 parts by weight of the polyolefin-based resin,
   wherein there is no discoloration between sheets thereof kneaded in temperature conditions of an initiation temperature of 40° C. and a termination temperature of 240° C.

2. The halogen-free flame-retardant resin composition according to claim 1, wherein the metal hydroxide comprises one of magnesium hydroxide, aluminum hydroxide, and calcium hydroxide.

3. The halogen-free flame-retardant resin composition according to claim 1, wherein the 1,3,5-triazine derivative comprises one of melamine, cyanuric acid, isocyanuric acid, melamine cyanurate, and melamine sulfate.

4. The halogen-free flame-retardant resin composition according to claim 1, further comprising a crosslinking agent.

5. A wire, comprising:
   a conductor; and
   an insulation layer provided over an outer periphery of the conductor, consisting of
      a polyolefin-based resin consisting of an ethylene-vinyl acetate copolymer (EVA), or an ethylene-vinyl acetate copolymer (EVA) and a low-density polyethylene (LDPE);
      a phenolic antioxidant comprising one of dibutylhydroxytoluene (BHT) and thiodiethylene bis[3-(3,5-di-tert-butyl-4-hydroxyphenyl)propionate], present in an amount of from 1 to 3 parts by weight relative to 100 parts by weight of the polyolefin-based resin;
      a metal hydroxide present in an amount of from 150 to 300 parts by weight relative to 100 parts by weight of the polyolefin-based resin;
      a pigment comprising one of monoazo yellow, benzimidazolone yellow, isoindolinone yellow, quinacridone red and perylene red;
      at least one an additive comprising an amide bond selected from the group consisting of 1,3-benzenedicarboxylic acid bis[2-(1-oxo-2-phenoxypropyl)hydrazide], 2-3-bis[[3-[3,5-di-tert-butyl-4-hydroxyphenyl]propionyl]] propionohydrazide, and dodecanedioic acid bis[N2-(2-hydroxybenzoyl)hydrazide], the at least one additive is present in an amount of from 0.01 to 2 parts by weight relative to 100 parts by weight of the polyolefin-based resin;
      a 1,3,5-triazine derivative present in an amount of from 5 to 40 parts by weight relative to 100 parts by weight of the polyolefin-based resin.

6. The wire according to claim 5, wherein the insulation layer has a tensile strength of not less than 10 MPa, and an elongation of not less than 150% in tensile testing in compliance with JIS C 3005.

7. The wire according to claim 5, wherein the burning time thereof in vertical flame testing in compliance with UL subject 758 is less than 1 minute.

8. The wire according to claim 5, further comprising a sulfur-based antioxidant.

9. The wire according to claim 5, further comprising a crosslinking agent.

10. A cable, comprising:
    one or more wires, each wire comprising
       a conductor, and
       an insulation layer provided over an outer periphery of the conductor; and
    a sheath provided over an outer periphery of the one or more wires, the sheath consisting of
       a polyolefin-based resin consisting of an ethylene-vinyl acetate copolymer (EVA), or an ethylene-vinyl acetate copolymer (EVA) and a low-density polyethylene (LDPE);
       a phenolic antioxidant comprising one of dibutylhydroxytoluene (BHT) and thiodiethylene bis[3-(3,5-di-tert-butyl-4-hydroxyphenyl)propionate], present in an amount of from 1 to 3 parts by weight relative to 100 parts by weight of the polyolefin-based resin;
       a metal hydroxide present in an amount of from 150 to 300 parts by weight relative to 100 parts by weight of the polyolefin-based resin, wherein the metal hydroxides is not a surface-treated metal hydroxide;
       a pigment comprising one of monoazo yellow, benzimidazolone yellow, isoindolinone yellow, quinacridone red and perylene red;
       at least one an additive comprising an amide bond selected from the group consisting of 1,3-benzenedicarboxylic acid bis[2-(1-oxo-2-phenoxypropyl)hydrazide], 2-3-bis[[3,5-di-tert-butyl-4-hydroxyphenyl] propionyl]] propionohydrazide, and dodecanedioic acid bis[N2-(2-hydroxybenzoyl)hydrazide], the at least one additive is present in an amount of from 0.01 to 2 parts by weight relative to 100 parts by weight of the polyolefin-based resin; and
       a 1,3,5-triazine derivative present in an amount of from 5 to 40 parts by weight relative to 100 parts by weight of the polyolefin-based resin.

11. The cable according to claim 10, wherein the 1,3,5-triazine derivative comprises one of melamine, cyanuric acid, isocyanuric acid, melamine cyanurate, and melamine sulfate.

12. The cable according to claim 10, wherein the sheath has a tensile strength of not less than 10 MPa, and an elongation of not less than 150% in tensile testing in compliance with JIS C 3005.

13. The cable according to claim 10, wherein the burning time thereof in vertical flame testing in compliance with UL subject 758 is less than 1 minute.

14. The cable according to claim 10, further comprising a sulfur-based antioxidant.

15. The cable according to claim 10, further comprising a crosslinking agent.

\* \* \* \* \*